United States Patent Office 2,776,977
Patented Jan. 8, 1957

2,776,977

HALOGEN SUBSTITUTED UNSATURATED AZOLYL ETHERS

John J. D'Amico, Charleston, W. Va., assignor to Monsanto Chemical Company, St. Louis, Mo., a corporation of Delaware No Drawing. Application April 18, 1955,
Serial No. 502,244

10 Claims. (Cl. 260—306)

The present invention relates to new compositions of matter and to methods for their preparation. More particularly, the present invention relates to haloalkene azolyl ethers.

The new compounds may be represented by the general formula

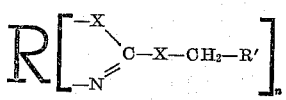

where R represents a carbocyclic radical containing less than 14 carbon atoms including carbocyclic hydrocarbon and halogen, hydroxy, alkoxy, amino and acetamino substituted derivatives thereof, X represents sulfur or oxygen, R' represents an unsaturated halogen substituted alkenyl group and $n$ is an integer at least one but less than three. R is part of one or two azolyl nuclei which are liked to a halogen substituted alkenyl group through an ether substituent in the 2-position of the azole nucleus.

Typical suitable examples of azolyl groups include benzobisthiazolyl, 6,6'-bibenzothiazolyl, benzothiazolyl, the 4-, 5-, 6- and 7-monomethylbenzothiazoles, 5-chlorobenzothiazolyl, phenylbenzothiazolyl, naphthothiazolyl, 2-mercapto-6, 7-dihydro-4,5-benzobenzothiazolyl, benzoxazolyl, naphthoxazolyl, 4-hydroxy-benzoxazolyl, 6-hydroxybenzoxazolyl, 5-chlorbenzoxazolyl, 6-chlorobenzoxazolyl, 7-chlorobenzoxazolyl, 5-benzyloxybenzoxazolyl 5-nitrobenzoxazolyl, 6-nitrobenzoxazolyl, 5-methylbenzoxazolyl, 5-ethylbenzoxazolyl, 5-butylbenzoxazolyl, 5-ethoxybenzoxazolyl, 5-methoxybenzoxazolyl, 5-aminobenzoxazolyl, 6-aminobenzoxazolyl, 5-phenylbenzoxazolyl, 5 - acetamidobenzoxazolyl, 6 - acetamidobenzoxazolyl, 5,7-dichlorobenzoxazolyl, 5,7-dimethylbenzoxazolyl, 5-tert-butyl-7-chlorobenzoxazolyl, 4,5,7-trichlorobenzoxazolyl and 4-methyl-5-chloro-7-isopropylbenzoxazolyl. Examples of R' include vinyl, allyl, propenyl, isopropenyl, butenyl, pentenyl, hexenyl, cinnamyl and decenyl groups substituted by one or more halogen atoms, as for example chlorine, bromine, fluorine and iodine.

The reactions can be effected readily by condensing the mercapto- or hydroxlazole, as the case may be, in the form of an aqueous solution of an alkali metal salt with a poly halo olefin, thereby removing one halogen atom from the latter as by-product alkali metal halide salt. Suitable substituted olefins include cis-1,2,3-trichloro-2-butene, trans-1,2,3-trichloro-2-butene, 1,3-dichloro-2-butene, 2,3-dichloro-1-propene, 2,3-dibromo-1-propene, 1,3-dichloro-propene, cis-1,2,3-trichloro-1-propene, trans-1,2,3-trichloro-1-propene, 1-chloro-3-iodo-2-propene, 1,3-diiodo-2-butene, 1-bromo-2,3-dichloro-2-butene, 1,4-dibromo-2,3-dichloro-2-butene, 2,3-diiodo-2-butene, 3-bromo-1-chloro-2-fluoro-1-propene and 2,3,3-trichloro-1-butene. The last readily undergoes an allylic rearrangement and is therefore equivalent to 1,2,3-trichloro-2-butene.

The following examples illustrate the preparation of the new products but are not to be taken as limitative.

Example 1

A solution containing 1.5 molecular proportions of 2-mercaptobenzothiazole was prepared by dissolving 258 parts by weight of 97% 2-mercaptobenzothiazole in 240 parts by weight of 25% sodium hydroxide and 1500 parts by weight of water. The solution of sodium mercaptobenzothiazole was filtered and to the filtered solution was gradually added 169 parts by weight of 1,3-dichloro-2-butene. An exothermic reaction set in, the temperature rising from 27° to 38° C. within 20 minutes. The reaction mixture was stirred for 5 hours and the organic layer separated. The unreacted 2-mercaptobenzothiazole was recovered from the aqueous layer by acidification with concentrated hydrochloric acid. The amber oily organic layer was dissolved in ethyl ether, washed repeatedly with 2% sodium hydroxide, then with water until the wash water was neutral to litmus and the solvent was removed by distillation. The residue was dried over Attapulgus clay. 322 parts by weight of an amber oily product was obtained. It boiled at 148–150° C./1 mm. Analysis confirmed that the product was the expected 1-(2-benzothiazolylmercapto)-3-chloro-2-butene. Calcd. for $C_{11}H_{10}ClNS_2$.

|  | Calcd. | Found |
| --- | --- | --- |
|  | Percent | Percent |
| Nitrogen | 5.48 | 5.73 |
| Sulfur | 25.07 | 25.42 |
| Chlorine | 13.86 | 13.43 |

Example 2

A solution of sodium mercaptobenzothiazole was prepared by mixing 172 parts by weight (1 molecular proportion) of 97% 2-mercaptobenzothiazole, 160 parts by weight (1 molecular proportion) of 25% aqueous sodium hydroxide and 1100 parts by weight of water. The solution was filtered, and to the stirred filtrate there was gradually added 63 parts by weight (0.5 molecular proportion) of 1,4-dichloro-2-butene. An exothermic reaction set in immediately, the temperature rising from room temperature to about 35° C. within 20 minutes. Stirring was continued for about 24 hours and the aqueous layer then decanted and the semi-solid residue diluted with 400 parts by weight of acetone. The acetone mixture was stirred thoroughly; white solids were filtered off and dried in an oven. 67 parts by weight of a white solid was obtained. It possessed a melting point of 147–151° C., which after crystallization from benzene melted at 153–155° C. It contained no chlorine, the analysis indicating it to be 1,4-bis(2-benzothiazolylmercapto)-2-butene resulting from the condensation of both chlorine atoms. Calcd. for $C_{18}H_{14}N_2S_4$:

|  | Calcd. | Found |
| --- | --- | --- |
|  | Percent | Percent |
| Nitrogen | 7.25 | 7.32 |
| Sulfur | 33.18 | 33.00 |

The acetone was removed from the filtrate by distillation under reduced pressure and the residue was dried over Attapulgus clay. 83 parts by weight of an oily product was obtained which could not be distilled under 1 mm. pressure without decomposition. Analysis indicated that this product was the desired 1-(2-benzothiazolylmercapto)-4-chloro-2-butene. Calcd. for C₁₁H₁₀ClNS₂:

|  | Calcd. | Found |
|---|---|---|
|  | Percent | Percent |
| Nitrogen | 5.48 | 5.75 |
| Sulfur | 25.07 | 25.08 |
| Chlorine | 13.86 | 13.43 |

Example 3

A solution of sodium mercaptobenzothiazole was prepared by mixing 190 parts by weight (1.1 molecular proportions) of 97% 2-mercaptobenzothiazole, 176 parts by weight (1.1 molecular proportions) of 25% aqueous sodium hydroxide and 1100 parts by weight of water. The solution was filtered and then stirred while 111 parts by weight (1 molecular proportion) of 2,3-dichloro-1-propene was gradually added thereto. The temperature rose from 28° to 34° C. over a period of an hour. Stirring was continued for 5 hours and the layers then separated, unreacted 2-mercaptobenzothiazole being recovered from the top aqueous layer by acidification. The amber oily product layer was dissolved in ethyl ether and washed repeatedly with 2% sodium hydroxide and then with water until the washings were neutral; the solvent was removed by distillation. There was obtained 229 parts by weight of an amber oily product which analysis indicated to be 3-(2-benzothiazolylmercapto)-2-chloro-1-propene. It boiled at 140–142° C./1 mm. Calcd. for C₁₀H₈ClNS₂:

|  | Calcd. | Found |
|---|---|---|
|  | Percent | Percent |
| Nitrogen | 5.79 | 5.92 |
| Sulfur | 26.53 | 26.0 |
| Chlorine | 14.66 | 14.47 |

Example 4

To a solution of sodium mercaptobenzothiazole prepared as described in the preceding example there was gradually added 130 parts by weight (0.81 molecular proportion) of trans-1,2,3-trichloro-2-butene. The temperature rose from 26 to 34° C. over a period of about an hour. Stirring was continued for 5 hours. The light yellow solid product was then filtered off, unreacted mercaptobenzothiazole being recovered by acidification of the filtrate. 184 parts by weight of a product melting at 38–41° C. was obtained, which upon recrystallization from ethyl alcohol melted at 43° C. Analysis indicated that the product was 1-(2-benzothiazolylmercapto)-trans-2,3-dichloro-2-butene. Calcd. for C₁₁H₉Cl₂NS₂:

|  | Calcd. | Found |
|---|---|---|
|  | Percent | Percent |
| Nitrogen | 4.83 | 4.87 |
| Sulfur | 22.09 | 22.10 |
| Chlorine | 24.43 | 24.13 |

Example 5

To a solution of sodium mercaptobenzothiazole prepared as in the last two preceding examples there was gradually added 111 parts by weight (1 molecular proportion) of 1,3-dichloro-1-propene. The temperature rose from 25° to 35° C. within 20 minutes due to the exothermic reaction. Stirring was continued for 5 hours and the organic layer separated and dissolved in ethyl ether. The ether solution was washed repeatedly with 2% sodium hydroxide and then with water until the washings were neutral to litmus. The ether was removed by distillation and the residue was dried over Attapulgus clay. In this manner there was obtained 220 parts by weight of an amber oily product which analysis indicated to be 3-(2-benzothiazolylmercapto)-1-chloro-1-propene. It boiled at 163–165° C./1 mm. Calcd. for C₁₀H₈ClNS₂:

|  | Calcd. | Found |
|---|---|---|
|  | Percent | Percent |
| Nitrogen | 5.79 | 5.87 |
| Sulfur | 26.53 | 26.28 |
| Chlorine | 14.66 | 15.06 |

Example 6

A solution of sodium 2,2'-dimercapto-6,6'-dibenzothiazole was prepared by mixing 33.2 parts by weight (0.1 molecular proportion) of 2,2'-dimercapto-6,6'-dibenzothiazole, 32.0 parts by weight (0.2 molecular proportion) of 25% aqueous sodium hydroxide and 250 parts by weight of water. To this solution there was added with stirring 25 parts by weight (0.2 molecular proportion) of 1,3-dichloro-2-butene. An exothermic reaction set in, the temperature rising from 24° to 32° C. in 5 minutes. The reaction mixture was stirred for 20 hours, the solid filtered, washed with water until the washings were neutral to litmus and air-dried at room temperature. The tan colored solid was obtained in 94.5% theory yield. After recrystallization from ethyl acetate it melted at 148–149° C. Analysis indicated that the product was 2,2'-bis(3-chloro-2-butenylmercapto)-6,6'-dibenzothiazole. Calcd. for C₂₂H₁₈Cl₂N₂S₄:

|  | Calcd. | Found |
|---|---|---|
|  | Percent | Percent |
| Nitrogen | 5.50 | 5.59 |
| Sulfur | 25.17 | 25.13 |
| Chlorine | 13.92 | 13.60 |

Example 7

In the procedure of Example 6, 50.0 parts by weight (0.15 molecular proportion) of 2,2'-dimercapto-6,6'-dibenzothiazole, 48 parts by weight (0.3 molecular proportion) of 25% sodium hydroxide, 350 parts by weight of water and 33.3 parts by weight (0.3 molecular proportion) of 2,3-dichloro-1-propene were used and the temperature rose from 27° to 31° C. in 20 minutes. The tan colored solid was obtained in 89.7% theory yield and after recrystallization from ethyl acetate melted at 113–114° C. Analysis indicated that the product was 2,2'-bis(2-chloroallylmercapto)-6,6'-dibenzothiazole. Calcd. for C₂₀H₁₄Cl₂N₂S₄:

|  | Calcd. | Found |
|---|---|---|
|  | Percent | Percent |
| Nitrogen | 5.82 | 5.88 |
| Sulfur | 26.64 | 26.23 |

Example 8

Substituting 33.3 parts by weight (0.3 molecular proportion) of 1,3-dichloropropene for the 2,3-dichloro-1-propene of Example 7, and with a temperature rise from 29° to 40° C. in 5 minutes, 70 parts by weight of a tan colored product was obtained which after recrystallization from ethyl acetate melted at 109–110° C. Analysis confirmed that the product was the expected 2,2'-bis(3-chloroallylmercapto)-6,6'-dibenzothiazole. Calcd. for C₂₀H₁₄Cl₂N₂S₄:

|  | Calcd. | Found |
|---|---|---|
|  | Percent | Percent |
| Nitrogen | 5.82 | 6.12 |
| Sulfur | 26.64 | 26.61 |

Example 9

To a stirred solution containing 38.3 parts by weight (0.19 molecular proportion) of 5-chloro-2-mercaptobenzothiazole, 7.6 parts by weight (0.19 molecular proportion) of sodium hydroxide and 500 parts by weight of water there was added 24 parts by weight (0.19 molecular proportion) of 1,3-dichloro-2-butene. A temperature rise of 3° C. was noted over a 10 minute period. The reaction mixture was stirred for 6 hours and filtered. The bottom dark amber oily layer was heated at 70° C./1 mm. in order to remove any unreacted chloro compound. The product was obtained in 87.0% theory yield. Analysis confirmed that the product was the expected 2-(3-chloro-2-butenylmercapto)-5-chlorobenzothiazole. Calcd. for $C_{11}H_9Cl_2NS_2$:

|  | Calcd. | Found |
| --- | --- | --- |
|  | Percent | Percent |
| Nitrgoen | 4.8 | 5.1 |
| Sulfur | 22.1 | 22.1 |
| Chlorine | 24.4 | 24.59 |

*Example 10*

To a stirred solution at 27° C. containing 21.9 parts by weight (0.1 mole) of 2-mercapto-6,7-dihydro-4,5-benzobenzothiazole (prepared as described in co-pending application Serial No. 493,548, filed March 10, 1955), 5.6 parts by weight (0.1 mole) of potassium hydroxide and 237 parts of acetone was added in one portion 11.1 parts by weight (0.1 mole) of 2,3-dichloro-1-propene. The stirred reaction mixture was heated at 50–60° C. for 4.5 hours and the potassium chloride removed by filtration. The filtrate was poured into 500 parts of ice-water and after stirring for 10 minutes the solid was filtered, washed with water until the washings were neutral to litmus and air-dried at 25° C. The product was obtained in 98.7% theory yield and after recrystallization from ethyl alcohol melted at 60–61° C. Analysis indicated that the product was 2-(2-chloroallylmercapto)6,7-dihydro-4,5-benzobenzothiazole. Calcd. for $C_{14}H_{12}ClNS_2$:

|  | Calcd. | Found |
| --- | --- | --- |
|  | Percent | Percent |
| Nitrogen | 4.77 | 4.79 |
| Sulfur | 21.83 | 21.63 |
| Chlorine | 12.07 | 11.91 |

*Example 11*

In the procedure of Example 10, 21.9 parts by weight (0.1 molecular proportion) of 2-mercapto-6,7-dihydro-4,5-benzobenzothiazole, 5.6 parts by weight (0.1 molecular proportion) of potassium hydroxide, 300 ml. of acetone and 12.5 parts by weight (0.1 molecular proportion) of 1,3-dichloro-2-butene were used. After removal of acetone in vacuo, the residue was dissolved in 400 ml. of ethyl ether, the ether solution washed with water until the washings were neutral to litmus and dried over sodium sulfate. Upon removal of ether in vacuo, a product was obtained in 88% yield melting at 63–65° C. Analysis confirmed that the product was the expected 2-(3-chloro-2-butenyl)-6,7-dihydro-4,5-benzobenzothiazole. Calcd. for $C_{15}H_{14}ClNS_2$:

|  | Calcd. | Found |
| --- | --- | --- |
|  | Percent | Percent |
| Nitrogen | 4.55 | 4.59 |
| Sulfur | 20.83 | 20.87 |

*Example 12*

To a stirred solution containing 37.8 parts by weight (0.25 molecular proportion) of 2-mercaptobenzoxazole and 40 parts by weight (0.25 molecular proportion) of 25% sodium hydroxide in 250 ml. of water was added 27.8 parts by weight (0.25 molecular proportion) of 2,3-dichloro-1-propene. An exothermic reaction set in immediately causing a temperature rise after which the reaction mixture was heated at 95–100° C. for 8 hours and cooled to 25° C. The reaction product was removed by extraction with 500 ml. of ether, the solution washed with water until the washings were neutral to litmus, dried over sodium sulfate and the ether removed in vacuo. The amber colored oil was obtained in 96% yield. Analysis indicated that the product was 2-(2-chloroallylmercapto)-benzoxazole. Calcd. for $C_{10}H_8ClNOS$:

|  | Calcd. | Found |
| --- | --- | --- |
|  | Percent | Percent |
| Nitrogen | 6.21 | 5.95 |
| Sulfur | 14.21 | 13.80 |

*Example 13*

The 2,3-dichloro-1-propene was substituted by 27.8 parts by weight (0.25 molecular proportion) of 1,3-dichloropropene in the procedure of Example 12. An amber colored oil was obtained in 97.5% yield. Analysis confirmed that the product was the expected 2-(3-chloroallylmercapto)benzoxazole. Calcd. for $C_{10}H_8ClNOS$:

|  | Calcd. | Found |
| --- | --- | --- |
|  | Percent | Percent |
| Nitrogen | 6.21 | 6.19 |
| Sulfur | 14.21 | 13.91 |

*Example 14*

The 2,3-dichloro-1-propene was substituted by 31.3 parts by weight (0.25 molecular proportion) of 1,3-dichloro-2-butene in the procedure of Example 12. An amber colored oil was obtained in 91.6% yield. Analysis indicated that the product was 2-(3-chloro-2-butenylmercapto)benzoxazole. Calcd. for $C_{11}H_{10}ClNOS$:

|  | Calcd. | Found |
| --- | --- | --- |
|  | Percent | Percent |
| Nitrogen | 5.84 | 6.26 |
| Sulfur | 13.38 | 13.31 |
| Chlorine | 14.79 | 14.61 |

*Example 15*

To a stirred solution containing 75.6 parts by weight (0.5 molecular proportion) of 2-mercaptobenzoxazole, 80 parts by weight (0.5 molecular proportion) of 25% sodium hydroxide and 500 ml. of water was added 72.7 parts by weight (0.5 molecular proportion) of cis- and trans 1,2,3-trichloropropene. An exothermic reaction set in immediately causing the temperature to rise sharply. The reaction mixture was heated at 95–100° C. for about 8 hours, cooled to 25° C. and the product extracted with 500 ml. of ether. The ether solution was washed with water until the washings were neutral to litmus, dried over sodium sulfate and the ether removed in vacuo. A yield of 77% of cis- and trans-2-(2,3-dichloroallylmercapto) benzoxazole was obtained as a dark amber colored oil. The product contained 5.85% nitrogen as compared to 5.38% nitrogen calculated for $C_{10}H_7Cl_2NOS$.

*Example 16*

To 236 parts by weight (0.25 molecular proportion) of a 17.74% solution of sodium mercaptobenzthiazole prepared as described there was added in one portion with stirring 36.4 parts by weight (0.25 molecular proportion) of cis- and trans-1,2,3-trichloropropene. The reaction mixture was heated at 50–60° C. for 4 hours, then cooled to room temperature and extracted with 300 ml. of ether. The ether solution was washed with water until neutral to litmus, dried over sodium sulfate and the ether removed in vacuo. The amber oil was obtained in 75.2% yield. Analysis confirmed that the product was the expected 2-(cis- and trans-2,3-dichloroallylmercapto) benzothiazole. Calcd. for $C_{10}H_7Cl_2NS_2$:

|  | Calcd. | Found |
| --- | --- | --- |
| Nitrogen | Percent 5.07 | Percent 5.15 |
| Sulfur | 23.22 | 23.22 |
| Chlorine | 25.67 | 26.0 |

Example 17

A solution of sodium 2-hydroxybenzothiazole was prepared by mixing 59 parts by weight (0.39 molecular proportion) of 2-hydroxybenzothiazole, 62.5 parts by weight (0.39 molecular proportion) of 25% aqueous sodium hydroxide and 200 parts by weight of water. To this solution there was added in one portion 57 parts by weight (0.39 molecular proportion) of cis- and trans-1,2,3-trichlropropene and the reaction mixture heated at 90–100° C. for 24 hours. The product was then extracted with 400 ml. of ether and the product isolated as in Example 16. A viscous amber oil was obtained in 78.8% theory yield. Analysis indicated that the product was 2-(cis- and trans - 2,3 - dichloroalloxy)benzothiazole. Calcd. for $C_{10}H_7Cl_2NOS$:

|  | Calcd. | Found |
| --- | --- | --- |
| Nitrogen | Percent 5.38 | Percent 5.46 |
| Sulfur | 12.33 | 12.99 |

Example 18

To a stirred solution containing 75.6 parts by weight (0.5 molecular proportion) of 2-hydroxybenzothiazole, 80.0 parts by weight (0.5 molecular proportion) of 25% aqueous sodium hydroxide and 500 parts by weight of water was added 62.5 parts by weight (0.5 molecular proportion) of 1,3-dichloro-2-butene. The reaction mixture was stirred at 25–30° C. for 20 hours, cooled to 15° C., extracted with 500 ml. of ethyl ether and isolated as described. A tan semi-solid was obtained in 60.3% theory yield. Analysis indicated that the product was 2-(3 - chloro - 2 - butenoxy) - benzothiazole. Calcd. for $C_{11}H_{10}ClNOS$:

|  | Calcd. | Found |
| --- | --- | --- |
| Nitrogen | Percent 5.84 | Percent 6.23 |
| Chlorine | 14.79 | 14.45 |

Example 19

In the procedure of Example 18, 151.2 parts by weight (1.0 molecular proportion) of 2-hydroxybenzothiazole, 160 parts by weight (1.0 molecular proportion) of 25% sodium hydroxide, 1000 parts by weight of water and 111.0 parts by weight (1.0 molecular proportion) of 2.3-dichloro-1-propene were used and the reaction product maintained at 98–100° C. for 20 hours. The tan colored solid was obtained in 82.5% theory yield and after recrystallization from ethyl alcohol it melted at 72–73° C. Analysis confirmed that the product was the expected 2-(2-chloroalloxy)benzothiazole. Calcd. for $C_{10}H_8ClNOS$:

|  | Calcd. | Found |
| --- | --- | --- |
| Nitrogen | Percent 6.21 | Percent 6.41 |
| Sulfur | 14.21 | 14.76 |
| Chlorine | 15.71 | 15.43 |

Example 20

Substituting 111.0 parts by weight (1.0 molecular proportion) of 1,3-dichloropropene for the 2,3-dichloro-1-propene of Example 19, a white solid was obtained in 83.5% theory yield melting at 87–89° C. Analysis indicated that the product was 2-(3-chloroallyloxy)benzothiazole. Calcd. for $C_{10}H_8ClNOS$:

|  | Calcd. | Found |
| --- | --- | --- |
| Nitrogen | Percent 6.21 | Percent 6.38 |
| Sulfur | 14.21 | 14.50 |

Example 21

To a stirred solution containing 172.0 parts by weight (1.0 molecular proportion) of 97% 2-mercaptobenzothiazole, 160 parts by weight (1.0 molecular proportion) of 25% aqueous sodium hydroxide and 1100 parts by weight of water was added 151.0 parts by weight (1.0 molecular proportion) of 1,3 - dichloro - 2,4-hexadiene. An exothermic reaction set in, the temperature rising from 27 to 37° C. The reaction mixture was stirred for about 24 hours, extracted with 500 ml. of ethyl ether and isolated as described. An amber colored oil was obtained in 84.0% theory yield. Analysis indicated that the product was 2-(3-chloro - 2,4 - hexadienylmercapto)-benzothiazole. Calcd. for $C_{13}H_{12}ClNS_2$:

|  | Calcd. | Found |
| --- | --- | --- |
| Nitrogen | Percent 4.64 | Percent 4.73 |
| Chlorine | 11.75 | 12.01 |

Some of the new compounds are vulcanizing agents for synthetic rubbery copolymers of butadiene and acrylonitrile commonly known by the trade names Hycar and Perbunan. They also possess vulcanizing and accelerating activity for the rubbery copolymers of isobutylene with a small proportion of diolefin (butyl rubber). Some of the compounds are soluble in mineral oil fractions and impart extreme pressure properties and corrosion inhibiting properties to mineral lubricating oil fractions in which they are incorporated. For example, mineral oil lubricants were prepared containing 5% by weight of the products of Examples 1 and 4 and the load carrying capacity measured by means of an S. A. E. machine. In both cases the lubricants containing the new compounds were characterized by extreme pressure properties. Corrosion inhibiting properties are also manifested in aqueous medium. The compounds have other uses as for example, herbicides, pesticides and intermediates. The method of destroying undesired vegetation is claimed in U. S. Patent 2,693,408, issued November 2, 1954. Other uses for the new compounds comprise defoliants, agents for combating marine growth, molluscacides, bacteriostats and fungistats. For example, 2 - (2 - chloroallylmercapto)benzoxazole controlled *Micrococcus pyogenes* at a dilution of 1:10,000. The compound also exhibited fungistatic action, controlling *Aspergillus niger* at the same dilution. The phytotoxicity of this compound was accompanied by severe chlorosis.

It is intended to cover all changes and modifications of the examples of the invention herein chosen for purposes of disclosure which do not constitute departures from the spirit and scope of the invention.

This application is a continuation-in-part of application Serial No. 265,211, filed January 5, 1952 and of application Serial No. 453,943, filed September 2, 1954.

What is claimed is:

1. A compound of the structure

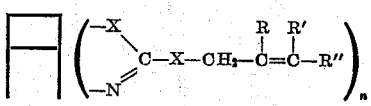

where A represents a radical containing less than 14 carbon atoms selected from the group consisting of aromatic hydrocarbon and unsaturated carbocyclic hydrocarbon and chloro, hydroxy, lower alkoxy, benzyloxy, nitro, amino and acetamino substituted derivatives thereof, X is selected from the group consisting of oxygen and sulfur, R and R' are selected from a group consisting of hydrogen and halogen, R" is selected from a group consisting of hydrogen, chloromethyl and open chain hydrocarbon containing less than four carbon atoms at least one of R, R' and R" comprising halogen and $n$ is an integer at least one but less than three.

2. A compound of the structure T—S—R where T is a thiazolyl group in which the radical attached to the sulfur and nitrogen atom to complete the thiazole ring is an aromatic hydrocarbon radical containing less than 13 carbon atoms and R is a chlorosubstituted 2-alkenyl group containing not more than 4 carbon atoms having the chlorine attached to unsaturated carbon, not more than one chlorine being attached to any one carbon atom.

3. A compound of the structure T—S—R where T is the benzothiazolyl group and R is a chlorosubstituted 2-alkenyl group containing not more than 4 carbon atoms having the chlorine attached to unsaturated carbon, not more than one chlorine being attached to any one carbon atom.

4. A compound of the structure

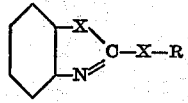

where X is a chalkogen of atomic weight less than 40 and R is a chlorosubstituted 2-alkenyl group containing not more than 4 carbon atoms having the chlorine attached to unsaturated carbon, not more than one chlorine being attached to any one carbon atom.

5. A compound of the structure

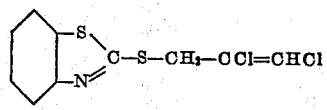

6. A compound of the structure

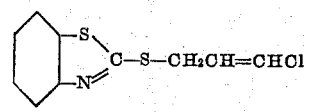

7. A compound of the structure

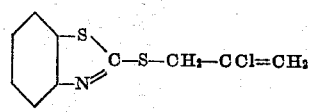

8. A compound of the structure

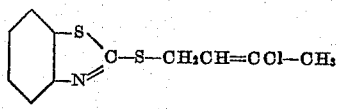

9. A compound of the structure

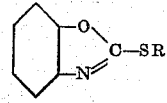

where R is a chlorosubstituted 2-alkenyl group containing not more than 4 carbon atoms having the chlorine attached to unsaturated carbon, not more than one chlorine being attached to any one carbon atom.

10. A compound of the structure

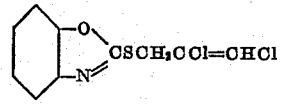

References Cited in the file of this patent
UNITED STATES PATENTS 2,425,526   Joyce ---------------- Aug. 12, 1947